(12) United States Patent
Miyazawa

(10) Patent No.: US 10,623,641 B2
(45) Date of Patent: Apr. 14, 2020

(54) IMAGE BLUR CORRECTION APPARATUS, CONTROL METHOD, IMAGING APPARATUS, AND LENS APPARATUS

(71) Applicant: CANON KABUSHIKI KAISHA, Tokyo (JP)

(72) Inventor: Hitoshi Miyazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/903,663

(22) Filed: Feb. 23, 2018

(65) Prior Publication Data

US 2018/0255245 A1   Sep. 6, 2018

(30) Foreign Application Priority Data

Mar. 2, 2017 (JP) ................. 2017-039237

(51) Int. Cl.
*H04N 5/232* (2006.01)

(52) U.S. Cl.
CPC ..... *H04N 5/23254* (2013.01); *H04N 5/23261* (2013.01); *H04N 5/23264* (2013.01); *H04N 5/23293* (2013.01); *H04N 5/23299* (2018.08); *H04N 5/23212* (2013.01); *H04N 5/23216* (2013.01)

(58) Field of Classification Search
CPC ........... H04N 5/23254; H04N 5/23261; H04N 5/23299; H04N 5/23293; H04N 5/23264; H04N 5/23212; H04N 5/23216
See application file for complete search history.

(56) References Cited

U.S. PATENT DOCUMENTS

| 2008/0094498 | A1* | 4/2008 | Mori ........................ G03B 5/02 348/352 |
| 2009/0219415 | A1* | 9/2009 | Matsunaga ............ H04N 5/272 348/239 |
| 2010/0271494 | A1* | 10/2010 | Miyasako .......... G06K 9/00261 348/208.1 |
| 2015/0002684 | A1* | 1/2015 | Kuchiki ............. H04N 5/23232 348/208.4 |

(Continued)

FOREIGN PATENT DOCUMENTS

JP     2006-317848 A    11/2006

*Primary Examiner* — Shahbaz Nazrul
(74) *Attorney, Agent, or Firm* — Carter, DeLuca & Farrell LLP

(57) ABSTRACT

An imaging system includes an angular velocity sensor configured to detect shake, and controls driving of a shift lens group on the basis of a shake detection signal and corrects image blur. A motion vector detection unit detects a motion vector from a plurality of captured images. A distance acquisition unit acquires distance information regarding the captured image. A camera control unit acquires the shake detection signal and the motion vector, determines a subject using a detection value of the motion vector in the direction of the closest distance based on the distance information, and calculates an angular velocity of the subject. A panning control unit of a lens control unit performs drive control of the shift lens group using an angular velocity detection signal from which an offset is removed and an angular velocity of the subject acquired from the camera control unit and thus performs control for supporting panning.

14 Claims, 8 Drawing Sheets

(56) References Cited

U.S. PATENT DOCUMENTS

| | | | |
|---|---|---|---|
| 2015/0043786 A1* | 2/2015 | Ohki | H04N 5/23254 |
| | | | 382/107 |
| 2015/0237260 A1* | 8/2015 | Mukunashi | H04N 5/23287 |
| | | | 348/208.11 |
| 2016/0165139 A1* | 6/2016 | Takayanagi | H04N 5/23261 |
| | | | 348/208.4 |
| 2016/0269636 A1* | 9/2016 | Kuchiki | H04N 5/232 |
| 2017/0006228 A1* | 1/2017 | Takayanagi | H04N 5/23293 |
| 2017/0155842 A1* | 6/2017 | Takayanagi | G06T 5/003 |
| 2017/0214838 A1* | 7/2017 | Miyazawa | H04N 5/2353 |

* cited by examiner

IMAGE BLUR CORRECTION APPARATUS, CONTROL METHOD, IMAGING APPARATUS, AND LENS APPARATUS

BACKGROUND OF THE INVENTION

Field of the Invention

The present invention relates to an image blur correction apparatus, a control method, an imaging apparatus, and a lens apparatus.

Description of the Related Art

Panning is one imaging technique for expressing a feeling of dynamism in a subject, and is a technique in which a shutter speed is set to low, and imaging is performed while a user causes a camera to follow the movement of a subject that is moving, for example, in a horizontal direction.

Panning is considered to be a difficult imaging technique for beginners, for two reasons. The first reason is that it is difficult to perform imaging while following with the camera without there being deviation between the subject and the camera. When there is a deviation between the subject and the camera, subject shake occurs. The second reason is that the user does not know an optimum setting value for the shutter speed. When the shutter speed is set to low, since an amount of flow in the background increases, a feeling of dynamism in the subject is obtained, but hand shake and subject shake are likely to occur.

In order to increase a probability of success of panning, a function of supporting panning (hereinafter referred to as panning assist) is known. As an example of panning assist, a function of detecting a deviation between a subject and a camera and correcting subject shake according to the deviation in an optical correction system (hereinafter referred to as a first assist function) may be provided. In addition, a function of a camera automatically setting a shutter speed for panning (hereinafter referred to as a second assist function) may be provided. In Japanese Patent Laid-Open No. 2006-317848, an imaging apparatus in which a difference between a speed of a subject and a speed at which a camera is moved is detected for a first assist function and an amount of deviation corresponding to the difference is corrected by a hand shake correction function is disclosed.

In the imaging apparatus disclosed in Japanese Patent Laid-Open No. 2006-317848, when a difference between a speed of a subject and a speed at which a camera is moved is detected, a motion vector and an angular velocity are used. A vector corresponding to the subject (hereinafter referred to as a subject vector) is detected from the vector detected as the motion vector, and a deviation between the subject and the camera is detected.

However, since the angular velocity sensor includes an inherent offset component, a calculation error occurs due to the offset component. In addition, when a movement amount on an image plane (hereinafter referred to as amount of movement on an image plane) is calculated in order to compare the angular velocity with the vector, division by a frame rate is performed. When the offset component is superimposed on an output of the angular velocity sensor and the frame rate in a low luminance imaging scene is low, a calculation error of the amount of movement on an image plane increases. As a result, the subject vector may be erroneously detected.

SUMMARY OF THE INVENTION

According to the present invention, in image blur correction in which image blur of a subject is corrected, a movement amount of a subject in a screen is detected with high accuracy.

An image blur correction apparatus according to an embodiment of the present invention includes a memory; and one or more processors, wherein the processor functions as the following units according to a program stored in the memory: a detection unit configured to detect movement information between a plurality of images captured by an imaging apparatus, wherein the detection unit detects movement information of a plurality of image areas; a selection unit configured to select a target area from the plurality of image areas on the basis of distance information of the plurality of image areas; and a control unit configured to correct image blur of a subject present in the target area on the basis of movement information of the imaging apparatus and movement information of the target area selected by the selection unit.

Further features of the present invention will become apparent from the following description of exemplary embodiments (with reference to the attached drawings).

DESCRIPTION OF THE EMBODIMENTS

Figure 1:
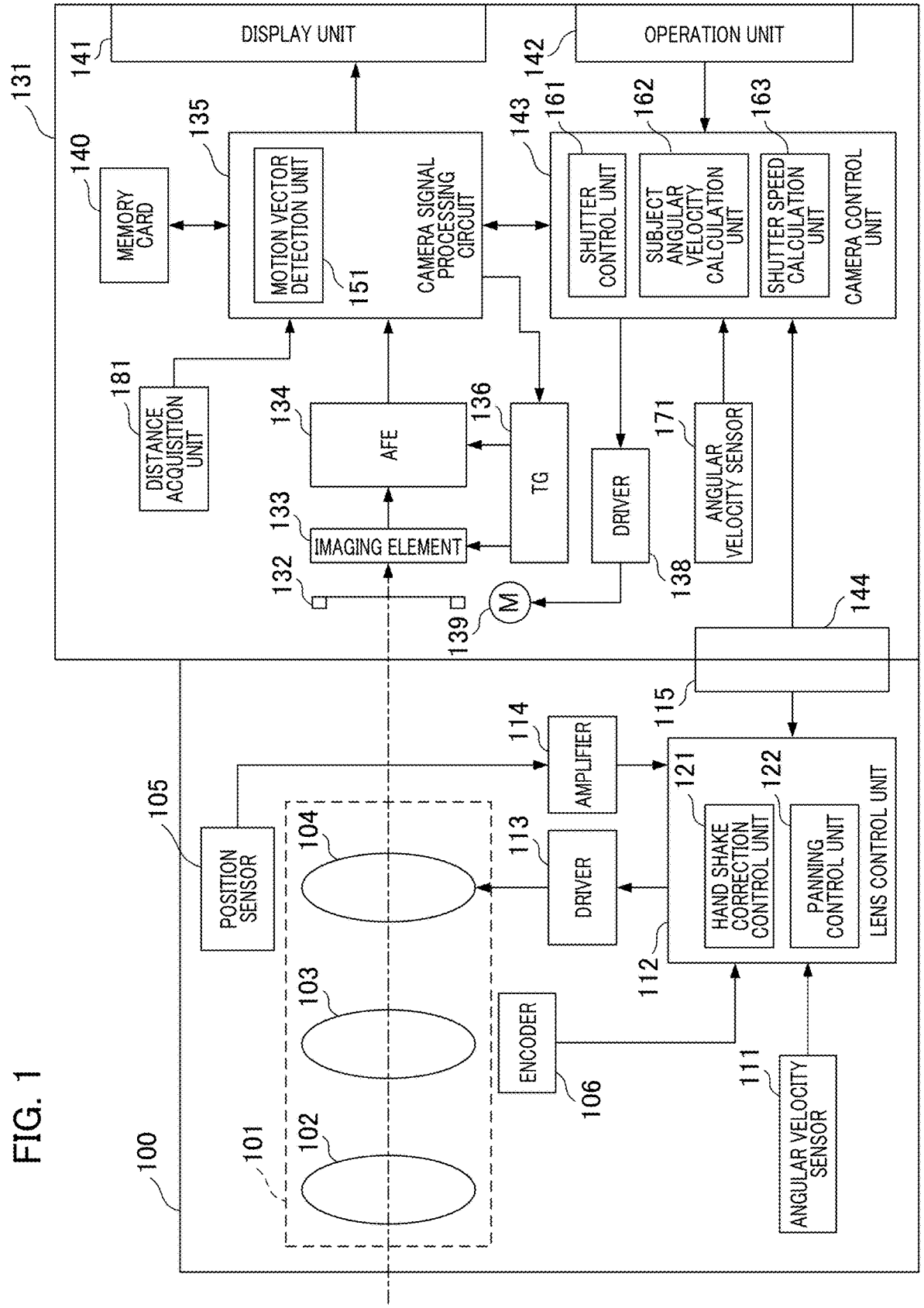
FIG. 1 is a diagram showing a configuration of an imaging apparatus in the present embodiment.

An embodiment of the present invention will be described below with reference to the drawings. FIG. 1 is a diagram showing a configuration example of an imaging apparatus according to the present embodiment. As an example of an imaging system in which an interchangeable lens 100 is able to be attached to a camera main body 131, a digital camera having a panning assist function for supporting panning will be described. A control mode when panning assist is set will be referred to as a "panning assist mode."

The interchangeable lens 100 includes an imaging lens unit 101. The imaging lens unit 101 includes a main imaging optical system 102, a zoom lens group 103 capable of changing a focal length, and a shift lens group 104 for image blur correction. The shift lens group (hereinafter simply referred to as a shift lens) 104 functions as a correction lens that changes an imaging position of light from a subject and thus corrects image blur. When a shift lens is moved in a direction perpendicular to an optical axis of the imaging lens unit 101, it is possible to optically correct shake of an image with respect to the optical axis due to shake of the imaging apparatus.

The interchangeable lens 100 includes a zoom encoder 106, a position sensor 105, and an angular velocity sensor 111. The zoom encoder 106 detects a position of the zoom lens group 103. The position sensor 105 detects a position of the shift lens group 104. The angular velocity sensor 111 is an example of a shake detection unit configured to detect shake of the imaging apparatus and outputs a shake detection signal.

A lens control unit 112 includes a microcomputer for lens system control. The lens control unit 112 controls driving of the shift lens group 104 through a driver 113. An amplifier 114 amplifies an output of the position sensor 105 of the shift lens group 104 and outputs a position detection signal to the lens control unit 112.

The interchangeable lens 100 includes a mounting contact unit 115, and is connected to a mounting contact unit 144 of the camera main body 131. The lens control unit 112 includes first and second control units. The first control unit is a hand shake correction control unit 121 configured to perform hand shake correction control. The second control unit is a panning control unit 122 configured to perform control for panning assist. The lens control unit 112 additionally performs focus adjustment control and aperture control according to movement of a focus lens, but this will be omitted for simplification of the drawing. In addition, in handshake correction by the hand shake correction control unit 121, shake in two orthogonal axes, for example, in a horizontal direction and a vertical direction, is detected and corrected. However, since configurations regarding the two axes are the same, only one axis will be described. In this manner, the imaging apparatus of the present embodiment includes an image blur correction apparatus configured to perform image blur correction by moving an optical element (shift lens) in a direction orthogonal to the optical axis.

The camera main body 131 includes a shutter 132 for controlling an exposure time. An imaging element 133 is, for example, a complementary metal-oxide-semiconductor (CMOS) type image sensor, and receives light from an image-forming subject through the imaging optical system, performs photoelectric conversion on the light and outputs an electronic signal. An analog signal processing circuit (AFE) 134 processes an output signal of the imaging element 133 and supplies it to a camera signal processing circuit 135.

The camera signal processing circuit 135 includes a motion vector detection unit 151. The motion vector detection unit 151 detects movement of the subject on the basis of the output signal of the imaging element 133. In addition, the camera signal processing circuit 135 processes the output signal of the imaging element 133, outputs a recording signal to a memory card 140, and outputs a display signal to a display unit 141. A timing generator (TG) 136 sets operation timings of the imaging element 133 and the analog signal processing circuit 134. An operation unit 142 includes a power switch, a release switch, a selector switch, and the like. A user can set the panning assist mode by operating the selector switch.

A camera control unit 143 includes a microcomputer for camera system control and controls components of the imaging system. The camera control unit 143 includes a shutter control unit 161, a subject angular velocity calculation unit 162, and a shutter speed calculation unit 163. The shutter control unit 161 controls a shutter driving motor 139 through a driver 138 and controls an operation of the shutter 132. The subject angular velocity calculation unit 162 calculates an angular velocity of a main subject. The shutter speed calculation unit 163 calculates a shutter speed when the panning assist mode is set.

The memory card 140 is a recording medium for recording a signal of a captured video. The display unit 141 includes a display device such as a liquid crystal panel (LCD). The display unit 141 displays an image to be captured by the user using a camera on a monitor and displays the captured image on a screen.

The camera main body 131 includes the mounting contact unit 144 with the interchangeable lens 100. The lens control unit 112 and the camera control unit 143 perform serial communication at a predetermined timing through the mounting contact units 115 and 144. An angular velocity sensor 171 detects shake of the camera main body 131 and outputs a shake detection signal to the camera control unit 143. A distance acquisition unit 181 acquires distance information regarding the captured image and outputs it to the camera signal processing circuit 135.

In the imaging system in FIG. 1, the user operates the power switch of the operation unit 142, and when a power supply of the camera is turned ON, the camera control unit 143 detects a change in the state. The camera control unit 143 supplies power to circuits of the camera main body 131 and performs initial setting. In addition, power is supplied to the interchangeable lens 100, and the lens control unit 112 performs initial setting in the interchangeable lens 100. After the camera control unit 143 and the lens control unit 112 are brought into a state in which they can communicate with each other, communication between the units starts at a predetermined timing. In communication from the camera control unit 143 to the lens control unit 112, a state of the camera, imaging setting information, and the like are transmitted. In addition, in communication from the lens control unit 112 to the camera control unit 143, focal length information of the interchangeable lens 100, angular velocity information, and the like are transmitted.

The user can change between a normal mode and a panning assist mode by operating the selector switch of the operation unit 142. The normal mode is a mode in which the panning assist mode is not set. When the normal mode is selected, in the interchangeable lens 100, the angular velocity sensor 111 detects shake applied to the camera due to hand shake or the like. The hand shake correction control unit 121 controls driving of the shift lens group 104 using a detection signal from the angular velocity sensor 111. Therefore, a hand shake correction operation is performed and image blur of the captured image is reduced.

Figure 2:
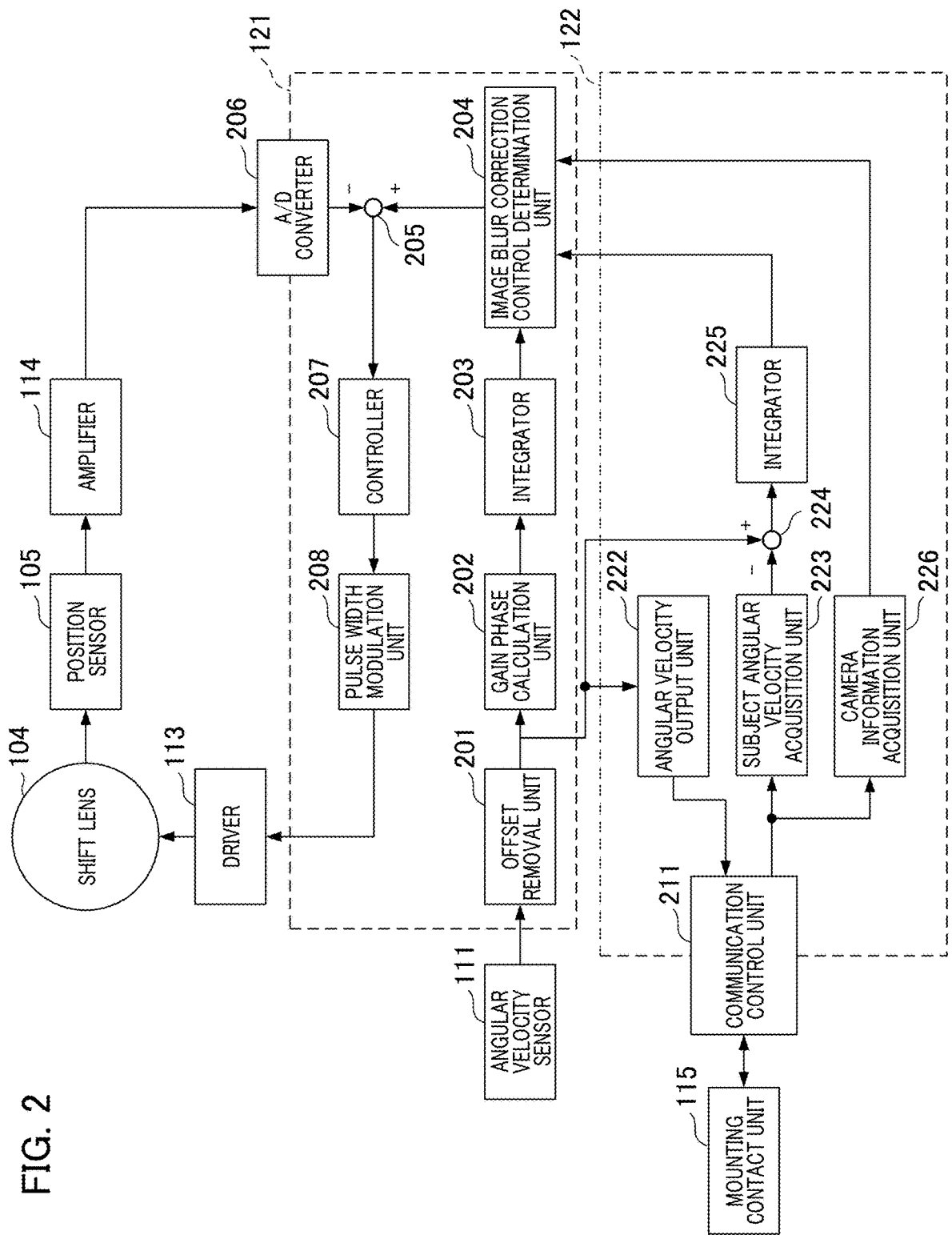
FIG. 2 is a control block diagram of an optical correction system in the present embodiment.

A hand shake correction function will be described with reference to FIG. 2. FIG. 2 is a configuration diagram related to hand shake correction and a panning assist operation. Components the same those in FIG. 1 are denoted with reference numerals the same those used in FIG. 1, and details thereof will be omitted.

The hand shake correction control unit 121 includes an offset removal unit 201, and removes an offset included in an angular velocity detection signal from the angular velocity sensor 111. The offset removal unit 201 removes a DC component included in an output of the angular velocity sensor 111 by, for example, a filter operation unit including a high pass filter (HPF) or the like. A gain phase calculation unit 202 acquires an output of the offset removal unit 201 and performs amplification and phase compensation. The gain phase calculation unit 202 includes an amplifying unit configured to amplify an angular velocity signal from which an offset component is removed with a predetermined gain and a phase compensation filter. An integrator 203 integrates outputs of the gain phase calculation unit 202. The integrator 203 has a function of being able to change its characteristics in an arbitrary frequency band and calculates a drive amount of the shift lens group 104.

The hand shake correction control unit 121 performs a panning (or tilting) determination process of the imaging apparatus. For example, when an angular velocity indicated by a detection signal of the angular velocity sensor 111 has a magnitude that is equal to or greater than a predetermined threshold value and a predetermined time (a time for threshold value determination) has passed, it is determined that a panning operation is in progress. In this case, a process of gradually changing a cutoff frequency of the HPF in the offset removal unit 201 to a higher frequency is performed. When the cutoff frequency is gradually changed to a higher frequency and a target signal for hand shake correction control is gradually reduced, control for returning the shift lens to the optical center position is performed. When this control is not performed, hand shake correction is performed by an angular velocity detection signal of shake that is strong enough to be determined as a panning operation. As a result, the shift lens may reach a correction limit point (a limit position of a control range) and a photographer may see an unnatural change in angle of view on a screen. When the process of gradually changing a cutoff frequency of the HPF to a higher frequency is performed, the occurrence of such a phenomenon can be prevented.

An image blur correction control determination unit (hereinafter referred to as a control determination unit) 204 acquires outputs of the integrator 203 and an integrator 225 to be described below, and switches a signal for driving the shift lens according to an output of a camera information acquisition unit 226 as follows.

(1) When the imaging mode is set to the panning assist mode,
the control determination unit 204 selects an output of the integrator 225 calculated by the panning control unit 122.
(2) When the imaging mode is set to a mode other than the panning assist mode,
the control determination unit 204 selects an output of the integrator 203 calculated by the hand shake correction control unit 121. Here, the integrator 225 and the camera information acquisition unit 226 will be described below.

The position sensor 105 detects a position of the shift lens group 104 and the amplifier 114 amplifies a detection signal. An analog to digital (AD) converter 206 digitizes the detection signal amplified by the amplifier 114 and outputs it to a subtractor 205. The subtractor 205 performs subtraction using an output of the control determination unit 204 as a positive input and an output of the A/D converter 206 as a negative input, and outputs deviation data which is a subtraction result to a controller 207. The controller 207 includes, for the deviation data output from the subtractor 205, an amplifying unit configured to perform amplification with a predetermined gain and a phase compensation filter. The deviation data is subjected to signal processing by the amplifying unit and the phase compensation filter in the controller 207 and then is output to a pulse width modulation unit 208. The pulse width modulation unit 208 acquires output data of the controller 207, modulates it into a waveform (that is, a PWM waveform) that changes a duty ratio of pulse waves, and outputs it to the driver 113 for driving the shift lens. A voice coil motor is used to drive the shift lens group 104. The driver 113 moves the shift lens group 104 in a direction perpendicular to the optical axis of the imaging optical system according to the output of the pulse width modulation unit 208.

Next, a first assist function for panning assist will be described.

The panning control unit 122 will be described with reference to FIG. 1 and FIG. 2. When the user performs an operation of setting the mode to the panning assist mode using the operation unit 142, the camera control unit 143 switches to panning assist control. In addition, information indicating the switching is transmitted from the camera control unit 143 to the lens control unit 112, and the lens control unit 112 switches to control in the panning assist mode. The camera information acquisition unit 226 (FIG. 2) acquires various pieces of camera information transmitted from the camera control unit 143 through a communication control unit 211. The camera information is, for example, setting information and release information of the panning assist mode. The camera information acquisition unit 226 outputs information necessary for a determination process to the control determination unit 204.

An angular velocity output unit 222 acquires an output of the offset removal unit 201, that is, an angular velocity detection signal of the angular velocity sensor 111 from which an offset component is removed. The angular velocity output unit 222 transmits the angular velocity detection signal to the camera control unit 143 through the communication control unit 211 and the mounting contact unit 115. A subject angular velocity acquisition unit 223 acquires data of an angular velocity of a subject calculated by the subject angular velocity calculation unit 162 in the camera main body 131 through the mounting contact unit 144 and the communication control unit 211. A subtractor 224 performs subtraction using an output of the offset removal unit 201 as a positive input and an output of the subject angular velocity acquisition unit 223 as a negative input. A deviation is calculated by subtracting an angular velocity indicated by the detection signal from which an offset component is removed from an angular velocity of a subject acquired by the subject angular velocity acquisition unit 223. The subtractor 224 outputs the deviation to the integrator 225. The integrator 225 integrates the deviation and outputs an integral operation result to the control determination unit 204.

In the process of calculating an angular velocity of a subject performed by the subject angular velocity calculation unit 162, a process in which movement amounts of an image are detected as vectors, and only a vector (a subject vector) corresponding to a subject is accurately detected from all the detected vectors is performed. A process of converting the detected subject vector into an angular velocity (subject angular velocity) is performed.

Figure 3:
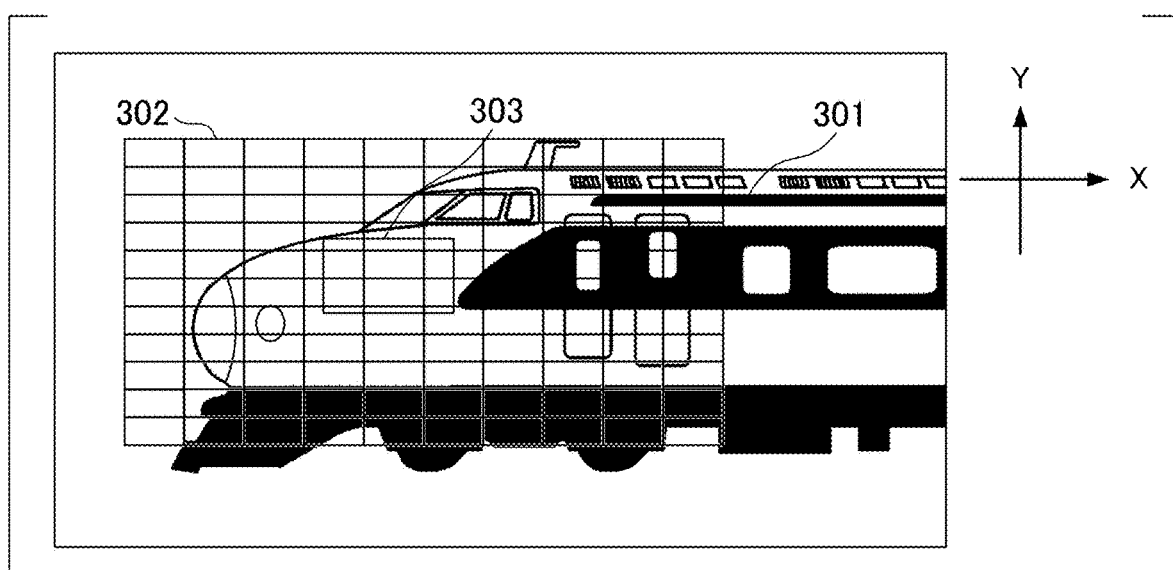
FIG. 3 is a diagram explaining vector detection during panning.

Here, a method of detecting a subject vector accurately will be described. In the camera main body 131, the motion vector detection unit 151 in the camera signal processing circuit 135 detects a motion vector during panning assist. That is, a motion vector of an image is detected from a plurality of pieces of video information on which signal processing is performed in the analog signal processing circuit 134. A specific example will be described with reference to FIG. 3. FIG. 3 shows an exemplary imaging scene of a subject 301 which is a moving subject. In the imaging screen, a horizontal direction is defined as an X direction and a vertical direction is defined as a Y direction. In this case, vectors of two types detected by the motion vector detection unit 151 are a vector corresponding to a part of the subject 301 and a vector corresponding to a background part. Rectangular frames corresponding to a plurality of detection blocks are detection frames 302 for detecting a motion vector. In setting in FIG. 3, in order to correct only shake of the subject in panning in an optical correction system, blocks are densely arranged. That is, when a dense arrangement is set, a detection accuracy of detection blocks corresponding to the detection frames 302 can increase. A focus frame (focus detection frame) 303 for focusing on the subject is indicated by a rectangular frame.

Figure 4A:
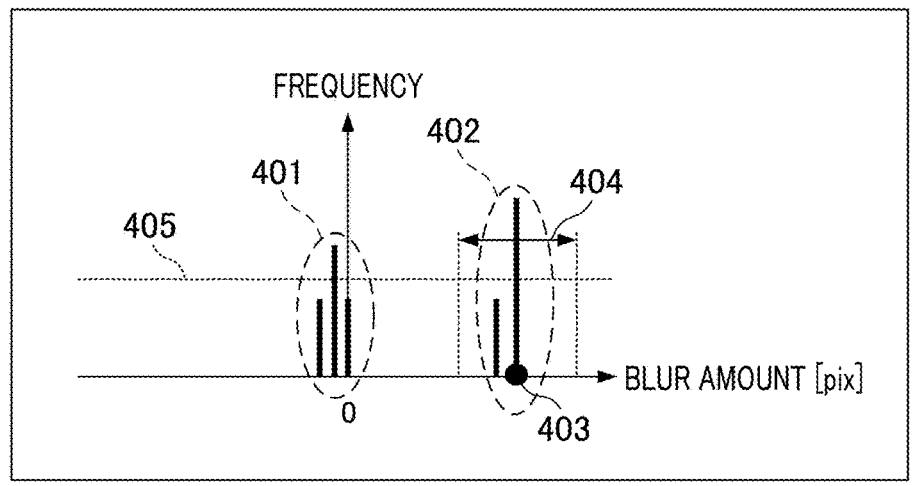
FIG. 4A to FIG. 4C are diagrams explaining subject vector detection in the present embodiment.
Figure 4B:
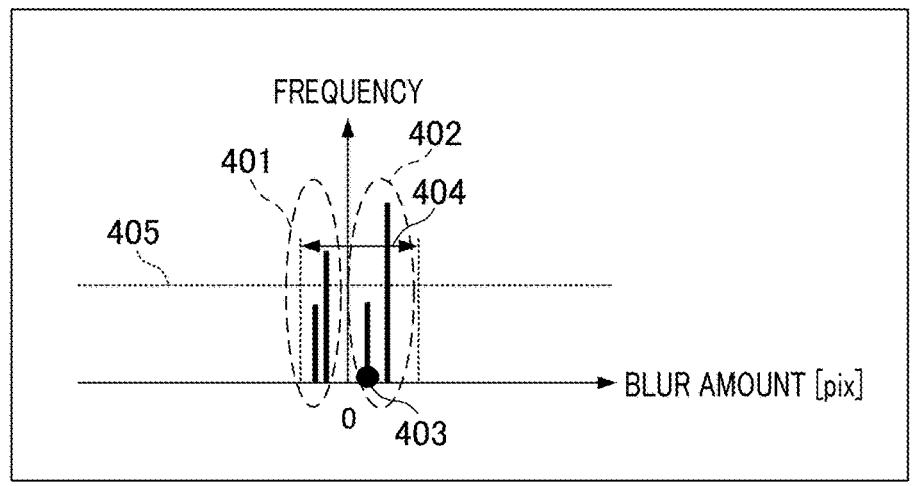
Figure 4C:
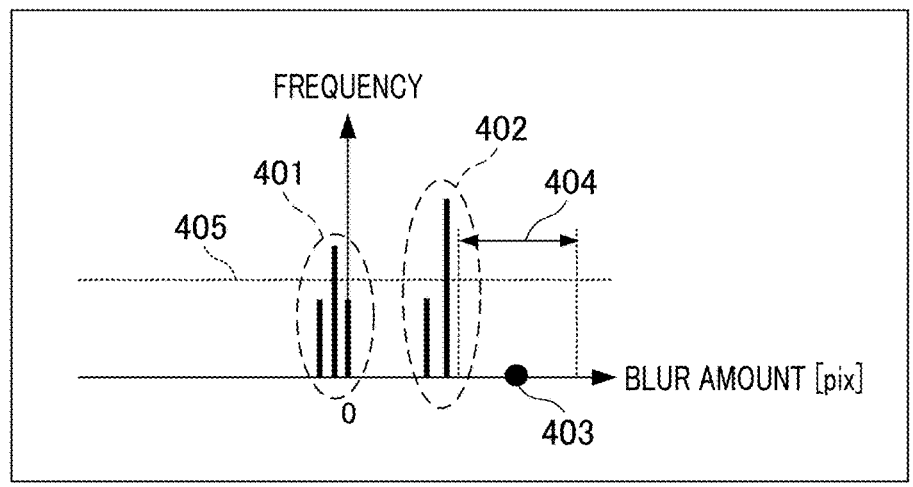

FIG. 4A to FIG. 4C show exemplary results of vectors detected by the motion vector detection unit 151 as histograms (frequency distribution). The horizontal axis represents a blur amount (unit: pixel) and corresponds to a motion vector. The vertical axis represents a frequency of the motion vector. FIG. 4A shows a histogram in the X direction (horizontal direction of a screen) in FIG. 3. FIG. 4B shows a histogram in the Y direction (vertical direction of a screen) in FIG. 3. FIG. 4C shows an exemplary histogram for describing miscalculation related to an amount of movement on an image plane.

First, an operation in the X direction will be described with reference to FIG. 4A. In capturing the subject 301 in FIG. 3, when the camera can successfully follow movement of the subject 301, an amount of deviation between the subject and the camera is small. In this case, a vector group 401 corresponding to the part of the subject 301 is present near 0 pix. On the other hand, when the camera cannot successfully follow movement of the subject 301, an amount of deviation between the subject and the camera is large. As a result, the vector group 401 corresponding to the part of the subject 301 is away from a position of 0 pix. The motion vector detection unit 151 does not determine whether the detected vector is a vector corresponding to a main subject (hereinafter referred to as a main subject vector) or a vector corresponding to a background (hereinafter referred to as a background vector). That is, at this stage, it is not possible to distinguish the vector group 401 corresponding to the subject 301 and a vector group 402 corresponding to the background. Thus, a process of determining the subject vector and the background vector is performed utilizing the fact that the size of the background vector is the same as an amount of shake on an image plane (amount of movement on an image plane). Specifically, an amount of movement on an image plane 403 is calculated from an angular velocity of the angular velocity sensor 111 in the interchangeable lens 100. Then, based on the amount of movement on an image plane 403, a vector present in a predetermined range (hereinafter referred to as a background determination threshold) 404 is determined as the background vector. In addition, a threshold value 405 for determining the subject is set on a frequency axis. A vector that is outside the range of the background determination threshold 404 and exceeds the threshold value 405 is determined as the subject vector.

The main subject vector serving as a vector that is finally used for control is calculated by a value obtained by integrating surrounding vectors concentrically using a position of a vector closest to the focus frame 303 (FIG. 3) of the camera in the vector group 401 determined as the subject vector as a starting point. For the subject vector, the reason why a subject vector closest to the focus frame 303 is used as a starting point is that the photographer generally sets the focus frame 303 on the main subject serving as an imaging target. The subject vector calculated by integration corresponds to an amount of movement on an image plane of the main subject. When the amount of movement on an image plane of the main subject is converted into an angular velocity, the angular velocity (a subject shake amount to be corrected) of the main subject is obtained. Here, as the angular velocity used to calculate an amount of movement on an image plane, in place of the angular velocity sensor 111, an angular velocity detected by the angular velocity sensor 171 in the camera main body 131 may be used.

Next, an operation of the camera in the Y direction will be described with reference to FIG. 4B. In the imaging scene in FIG. 3, it is assumed that the photographer performs an operation of moving the camera in the X direction. In this case, the angular velocity in the Y direction has a small value (for example, 1 deg/sec or less). That is, since the amount of movement on an image plane 403 in the Y direction is positioned near 0 pix, the small subject vector in the Y direction is included in a range of the background determination threshold 404. Therefore, the vector group 401 corresponding to the subject may be erroneously detected as a candidate for the background vector.

FIG. 4C exemplifies a case in which the amount of movement on an image plane 403 deviates from the background vector regardless of a vibration direction and a non-vibration direction of the camera and shows a case in which erroneous detection of the subject vector occurs. In a process in which an amount of movement on an image plane is calculated from an angular velocity in order to compare the angular velocity with a vector, an operation of multiplying an angular velocity by a focal length and dividing it by a frame rate is performed. Here, since a sensor-specific offset component is superimposed on the output of the angular velocity sensor 111, for example, even if the camera is in a stationary state, the angular velocity does not always become 0 deg/sec due to an influence of the offset component. The offset component also varies according to a change in temperature. In addition, the frame rate may be low depending on an imaging environment and the reason for this will be described with reference to FIG. 5.

Figure 5:
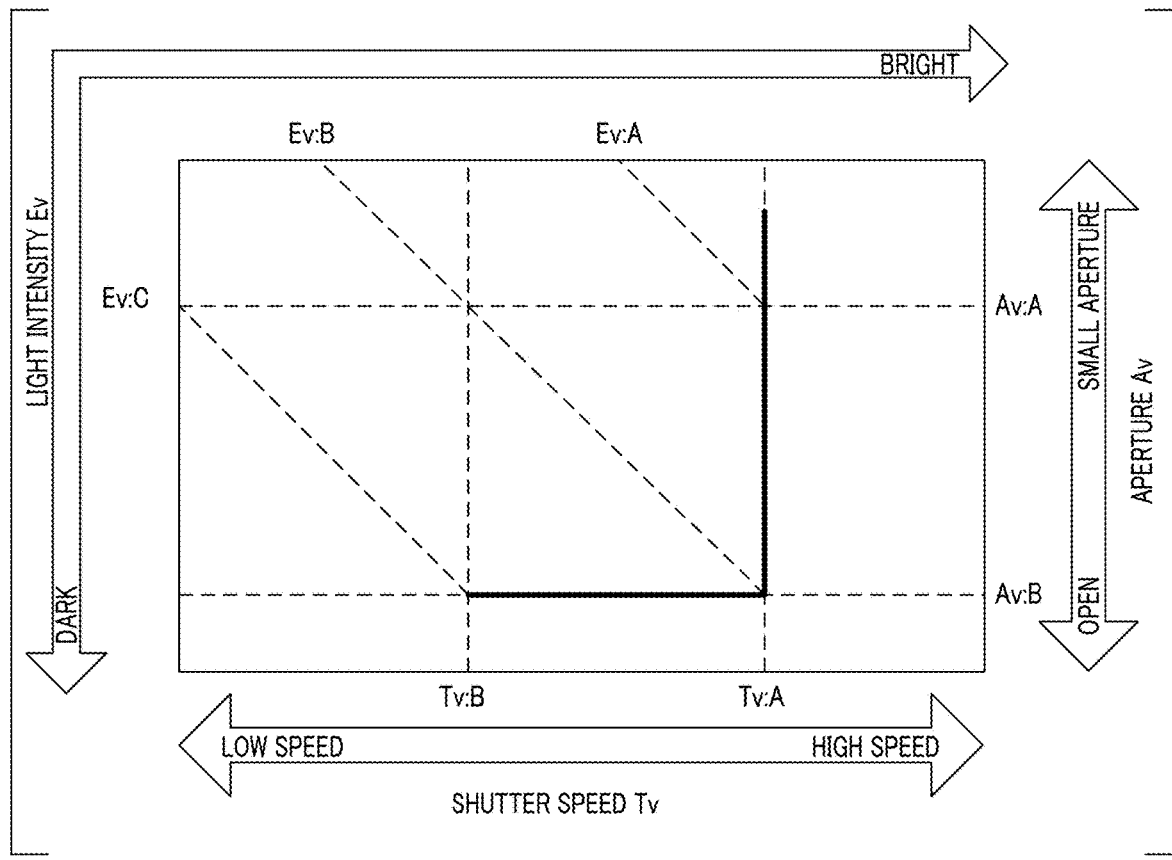
FIG. 5 is a schematic diagram of a program diagram of panning assist in the present embodiment.

FIG. 5 is a schematic diagram showing a program diagram before exposure during panning and shows a light intensity Ev value, a shutter speed Tv value, and an aperture Av value. An exposure amount Ev: A indicates outdoor brightness during a sunny day. An exposure amount Ev: B indicates brightness of a dim room. An exposure amount Ev: C indicates brightness of a night scene with streetlights. When motion vector detection is performed using image data in which image blur occurs, the reliability of the motion vector detection may be lowered. Therefore, basically, a high shutter speed for the shutter speed Tv: A (for example, ¹⁄₂₅₀ seconds) is set. In the program diagram before exposure during panning, in a program diagram of shutter speed priority, exposure adjustment is performed using an aperture and ISO sensitivity. When ambient brightness is dim as indicated by the exposure amount Ev: B and appropriate exposure is not obtained even if the aperture is opened, control for changing the shutter speed Tv value is performed. That is, since an operation in which exposure is appropriately controlled and it becomes easier to image with a camera has a higher priority than displaying a screen in a low luminance state with the display unit 141, the shutter speed gradually changes to a slower speed from Tv: A to Tv: B. In this case, the frame rate is also changed to a slower speed according to the shutter speed. When the amount of movement on an image plane is calculated from the angular velocity, an offset component included in the output of the angular velocity sensor 111 and a calculation error of the amount of movement on an image plane 403 due to a decrease in the frame rate cause problems. That is, as shown in FIG. 4C, when the amount of movement on an image plane 403 deviates from the background vector 402, erroneous detection of the subject vector 401 may occur.

In the examples shown in FIG. 4B and FIG. 4C, when the subject vector cannot be correctly detected, in the present embodiment, it is possible to improve detection accuracy of the subject vector using distance information regarding an image that is acquired by the distance acquisition unit 181 (FIG. 1).

Figure 6:
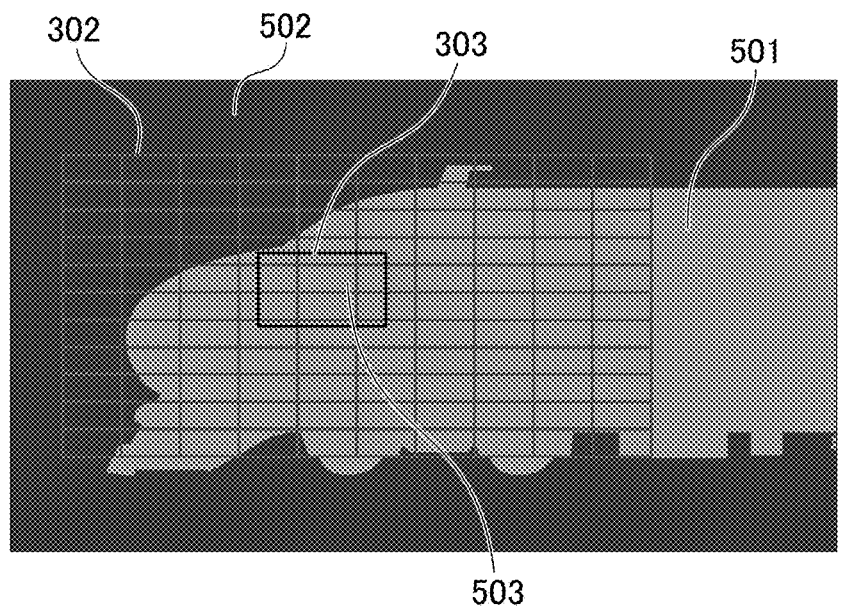
FIG. 6 is a diagram explaining distance information.

Here, image distance information obtained by the distance acquisition unit 181 will be described with reference to FIG. 6. Distance information (depth information) of the subject in the captured image is information indicating a distance relationship between the imaging apparatus and the subject in the depth direction. The distance information obtained by the distance acquisition unit 181 can be roughly classified into two distances, a distance 501 in the direction of the closest distance and a distance 502 in an infinity direction (direction to infinity). FIG. 6 shows an exemplary distance map corresponding to the image in FIG. 3. The distance 501 in the direction of the closest distance is a distance from a position of the camera to a subject on the side of the camera. The distance 502 in the infinity direction is a distance from a position of the camera to a subject on the side of the background.

Distance information is acquired by the following methods.

Method in which a Sensor (AF Sensor) for Auto Focus is Used

The distance acquisition unit 181 acquires distance information using an AF sensor for phase difference detection. In this case, the imaging apparatus includes a detection unit dedicated for AF, and a phase difference of an image signal is detected, and an image shift amount, a defocus amount, and the like can be acquired as distance information.

Method in which an Evaluation Value for Contrast Scheme AF is Used

The distance acquisition unit 181 acquires an evaluation value for auto focus from an image signal of the imaging element 133 according to contrast detection, and acquires distance information using the evaluation value.

Method in which an Image Plane Phase Difference Type Imaging Element Having an AF Function is Used When incident light that passes through the imaging lens is split into light beams in two directions using a pupil split type imaging element having a phase difference detection function, a pair of image signals are obtained. That is, light beams that pass through different pupil partial areas of the imaging optical system are received by a photoelectric conversion unit of the imaging element. The distance acquisition unit 181 acquires an image shift amount, a defocus amount, and the like from a phase difference between a pair of image signals after photoelectric conversion as distance information. Here, when the above three methods are used, a configuration in which distance information is acquired from only a part of the imaging screen is conceivable. In such a configuration, a range in which distance information can be acquired and the size of the detection frame 302 for detecting a motion vector can be preferably set so that the size of the detection frame 302 for detecting a motion vector is prevented from being larger than the range in which distance information can be acquired. In addition, in the detection frames 302, detection blocks are densely arranged in order to increase detection accuracy of a motion vector of the subject during panning. However, in order to correct image blur at a normal time (without panning), blocks are preferably discretely arranged in order to detect a motion vector of the entire imaging screen. Therefore, a detection frame for detecting a motion vector at a normal time is preferably larger than the range in which distance information can be acquired.

Method in which a Photographer Acquires a Set Value as Distance Information

In a configuration including a setting unit configured for a photographer to set a distance to a subject manually before imaging, the distance acquisition unit 181 acquires a value set by the setting unit as distance information.

The motion vector detection unit 151 extracts only a vector of a detection block positioned at the distance 501 in the direction of the closest distance on the basis of the distance information acquired by the distance acquisition unit 181. That is, in FIG. 6, a vector of a detection block (for example, $1^{st}$ row and $1^{st}$ column detection block) positioned in the distance 502 in the infinity direction is excluded so that it is not treated as the subject vector. In the example shown in FIG. 4B, a small subject vector candidate in a non-vibration direction of the camera is included in a range of the background determination threshold 404. In such a case, if the distance information in the direction of the closest distance has been acquired, using a detection block 503 (FIG. 6) closest to the focus frame 303 as a starting point, surrounding vectors of detection blocks positioned in the distance 501 in the direction of the closest distance can be integrated concentrically. Even if the highest frequency of a vector is less than the threshold value 405 for determining a subject vector, when the detection reliability of the motion vector detection unit 151 is high, the detected vector can be determined as the subject vector. The detection reliability of the vector detected by the motion vector detection unit 151 is a value that is output simultaneously with a vector detection value. For example, when there is no feature point in image information or when contrast of image information is low with low luminance, it is assumed that the detection reliability has a small value. That is, it is determined that the detection reliability of a vector, acquired when it is difficult for the motion vector detection unit 151 to detect image information of a target, is low. Here, this similarly applies to when the amount of movement on an image plane shown in FIG. 4C has an error, and when the distance information is used, detection accuracy of the subject vector is higher.

After the subject vector is determined, a process of calculating a subject angular velocity is performed. In a calculation process reverse to a process in which an amount of movement on an image plane [pix] is calculated from an angular velocity [deg/sec] using a focal length, a frame rate, and a pixel pitch of an imaging element, an angular velocity [deg/sec] can be calculated from an amount of movement on an image plane [pix]. The camera control unit 143 transmits a value obtained by adding angular velocity data obtained by the angular velocity output unit 222 in the interchangeable lens 100 to the angular velocity of the subject calculated by the subject angular velocity calculation unit 162 to the lens control unit 112. Transmission information of the camera control unit 143 is received by the lens control unit 112 in the interchangeable lens 100 through the mounting contact units 144 and 115.

Next, a second assist function for panning assist will be described.

The shutter speed calculation unit 163 in the camera main body 131 calculates a shutter speed for panning assist. Specifically, a shutter speed is calculated using the following information according to Formula (1).

$$TV = \alpha/f(\omega c - \omega s) \qquad (1)$$

In the formula,

TV: shutter speed,

α: a setting value for a background flow effect set by a photographer using the operation unit 142, f: a focal length of the interchangeable lens 100 obtained through the mounting contact units 115 and 144, ωc: an angular velocity detected by the angular velocity sensor 171 in the camera main body 131, and ωs: a subject angular velocity calculated by the subject angular velocity calculation unit 162.

A setting value α for the background flow effect is a preset value so that an amount of shake in a background image is, for example, 800 μm (micrometer), as an amount of movement on an image plane. Regarding the background flow effect, a plurality of effect levels such as weak, intermediate, strong, can be set. When the photographer simply sets the panning assist mode and sets a desired background flow effect, the camera main body 131 automatically sets and controls the shutter speed. Therefore, even if the photographer is unfamiliar with panning, he or she may easily set the shutter speed.

Figure 7:
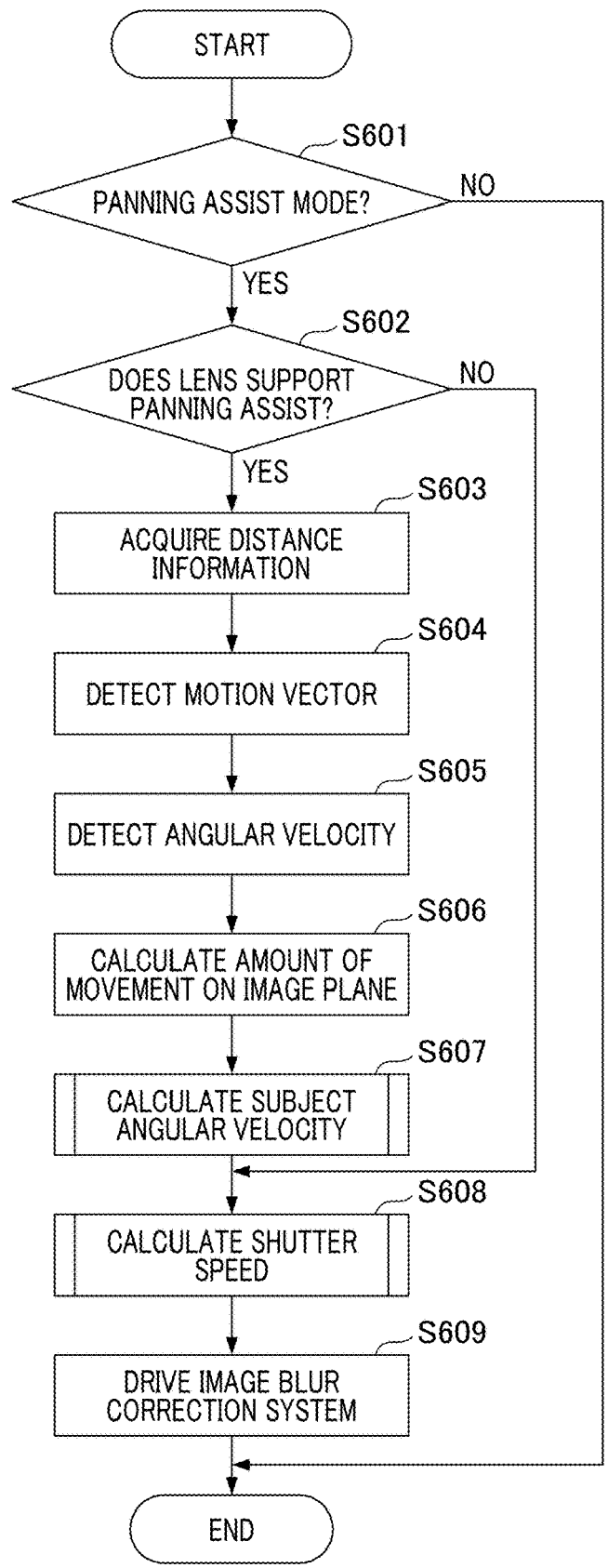
FIG. 7 is a flowchart of panning assist in the present embodiment.

Panning assist control will be described with reference to flowcharts in FIG. 7 to FIG. 9. FIG. 7 is a flowchart showing a flow of overall processes related to panning assist control. The following processes are realized when CPUs of the camera control unit 143 and the lens control unit 112 interpret and execute a predetermined control program.

(S601) Process of Determining Panning Assist Mode.

The camera control unit 143 determines whether a photographer sets a panning assist mode using the operation unit 142. When the panning assist mode is set, the process proceeds to S602. On the other hand, when a mode other than the panning assist mode is set, no panning assist control is performed and the process ends.

(S602) Process of Determining Interchangeable Lens 100.

The camera control unit 143 determines whether the interchangeable lens 100 attached to the camera main body 131 is an interchangeable lens that supports panning assist. When it is determined that the interchangeable lens 100 is an interchangeable lens that supports panning assist, the process proceeds to S603. On the other hand, when it is determined that the interchangeable lens 100 is an interchangeable lens that does not support panning assist, the process proceeds to S608. Here, the process of determining whether the interchangeable lens 100 supports panning assist is performed on the basis of a lens information signal transmitted from the lens control unit 112 to the camera control unit 143.

(S603) Acquiring Distance Information.

The distance acquisition unit 181 acquires distance information regarding a captured image. The motion vector detection unit 151 sets the detection frame 302 of the vector. Then, the process proceeds to S604.

(S604) Detecting Motion Vector.

The motion vector detection unit 151 detects a motion vector of the subject in the screen. Then, the process proceeds to S605.

(S605) Detecting Angular Velocity.

The angular velocity detection signal detected by the angular velocity sensor 111 is transmitted from the lens control unit 112 to the camera control unit 143. The camera control unit 143 acquires an angular velocity detection signal of shake. Then, the process proceeds to S606.

(S606) Calculating Amount of Movement on Image Plane.

The camera control unit 143 performs an operation of converting the angular velocity acquired in S605 into an amount of movement on an image plane. A movement amount on an image plane (amount of movement on an image plane) is calculated using the angular velocity detected by the angular velocity sensor 111 in the interchangeable lens 100, a focal length of the imaging optical system, and a frame rate. Then, the process proceeds to S607.

(S607) Calculating Subject Angular Velocity.

The subject angular velocity calculation unit 162 calculates an angular velocity of the main subject from the main subject vector determined from the vector detected in S604. A calculation process will be described below in detail with reference to FIG. 8. Then, the process proceeds to S608.

(S608) Calculating Shutter Speed.

The shutter speed calculation unit 163 calculates a shutter speed for panning assist. A calculation process will be described below in detail with reference to FIG. 9. Then, the process proceeds to S609.

(S609) Driving Image Blur Correction System.

The lens control unit 112 receives data items of the subject angular velocity calculated in S607 and the shutter speed for panning assist calculated in S608 from the camera control unit 143 and determines a control amount for driving the shift lens group 104 during an exposure period. The driver 113 drives the shift lens group 104 according to the determined control amount. An optical image blur correction system reduces a difference between the angular velocity during a panning operation of the camera and the angular velocity of the main subject. As a result, it is possible to increase a probability of success of panning. Then, the process in FIG. 7 ends.

A process of calculating the subject angular velocity shown in S607 in FIG. 7 and a process of calculating a hand shake correction amount will be described with reference to a flowchart in FIG. 8.

(S701) Generating Histogram.

The camera control unit 143 calculates histograms according to the vector detected in S604 in FIG. 7. After the histograms (FIG. 4A to FIG. 4C) are generated, the process proceeds to the following S702.

(S702) Determining Frame Rate.

The camera control unit 143 acquires a current frame rate and compares it with a preset threshold value (indicated by A). When it is determined that the acquired frame rate is equal to or greater than a threshold value A, the process proceeds to S703. On the other hand, when it is determined that that the acquired frame rate is less than the threshold value A, the process proceeds to S708.

(S703) Determining Offset.

The camera control unit 143 compares an offset component superimposed on the angular velocity sensor 111 with a preset threshold value (indicated by B). The offset component is acquired from the lens control unit 112. When it is determined that the offset component is equal to less than the threshold value B, the process proceeds to S704. On the other hand, when it is determined that the offset component is greater than the threshold value B, the process proceeds to S708.

(S704) Determining Ability to Detect Subject Vector.

The camera control unit 143 determines whether the subject vector has been detected based on the detection result of the motion vector detection unit 151. When it is determined that the subject vector has been detected, the process proceeds to S705. On the other hand, when it is determined that the subject vector has not been detected, the process proceeds to S708.

(S705) Subject Vector Calculation 1.

There are two types of subject vector calculation process performed by the camera control unit 143 and the camera signal processing circuit 135, which are a first calculation process shown in S705 and a second calculation process shown in S710 to be described below. In the first calculation process, a process of searching for detection blocks concentrically using a detection block closet to a position of the focus frame 303 exemplified in FIG. 3 as a starting point is performed and a process of integrating a certain number of subject vectors is performed. Then, the process proceeds to S706.

(S706) Calculating Subject Angular Velocity.

When the main subject is determined, the subject angular velocity calculation unit 162 calculates an angular velocity of the main subject. That is, according to a method reverse to a method in which an amount of movement on an image plane is calculated from the angular velocity in S606 in FIG. 7, a process of calculating a subject angular velocity from the amount of movement on an image plane of the main subject is performed. Then, the process proceeds to S707.

(S707) Calculating Subject Shake Correction Amount.

The camera control unit 143 adds a value of the angular velocity transmitted from the angular velocity output unit 222 to the camera control unit 143 to the subject angular velocity calculated in S706 and transmits it to the lens control unit 112. The subject angular velocity acquisition unit 223 acquires the subject angular velocity transmitted from the camera control unit 143 to the lens control unit 112 and outputs it to the subtractor 224. The subtractor 224 calculates a difference between the angular velocity of the angular velocity sensor 111 in the interchangeable lens 100 and the subject angular velocity. The integrator 225 integrates the calculated difference and outputs it to the control determination unit 204 as a target control value (subject shake correction amount) of shake correction control of the subject. Then, the process transitions to a return process.

(S708) Determining Ability to Acquire Distance Information in Direction of Closest Distance.

The camera control unit 143 determines whether distance information corresponding to the distance 501 in the direction of the closest distance in FIG. 6 has been acquired on the basis of the distance information acquired by the distance acquisition unit 181. When it is determined that distance information in the direction of the closest distance has been acquired, the process proceeds to S709. When it is determined that distance information in the direction of the closest distance has not been acquired, the process proceeds to S711, and control is switched to hand shake correction control instead of shake correction control of the subject.

(S709) Determining Detection Reliability.

The camera control unit 143 determines the reliability of vector detection related to detection blocks to be integrated concentrically using a detection block closest to the focus frame 303 shown in FIG. 3 as a starting point. When it is determined that the number of detection blocks having high reliability of vector detection is equal to or greater than a threshold value, the process proceeds to S710. In addition, when it is determined that the number of detection blocks having high reliability of vector detection is less than a threshold value, the process proceeds to S711, and control is switched to hand shake correction control instead of shake correction control of the subject.

(S710) Subject Vector Calculation 2.

When the distance information in the direction of the closest distance has been acquired in S708 and the reliability of vector detection in S709 is high, the second calculation process is performed in this step. In this case, using a detection block closest to the focus frame 303 in FIG. 3 as a starting point, vectors of surrounding detection blocks positioned in the direction of the closest distance are integrated concentrically. Then, the process proceeds to S706.

(S711) Acquiring Angular Velocity.

When negative determination results are obtained in S702 to 704, S708, and S709, the process transitions to this step, control is switched to hand shake correction control, and the hand shake correction control unit 121 performs control. The angular velocity detected by the angular velocity sensor 111 in the interchangeable lens 100 is acquired, and the process proceeds to the following S712.

(S712) Removing Offset.

The hand shake correction control unit 121 of the lens control unit 112 removes an offset component superimposed on the angular velocity acquired in S711. For example, there is a method in which a high pass filter having a function of being able to change characteristics in an arbitrary frequency band is used. In this method, when a low frequency component included in the angular velocity is blocked by the high pass filter and a high frequency band signal is output, the offset component superimposed on the angular velocity is removed.

(S713) Calculating Gain and Phase.

The gain phase calculation unit 202 in FIG. 2 calculates a gain and a phase when a filtering process is performed with respect to the angular velocity from which the offset is removed in S712. After signal processing is performed on the angular velocity detection signal according to an amplifying unit configured to perform amplification with a predetermined gain and a filter circuit including a phase compensation filter, the process proceeds to the following S714.

(S714) Calculating Hand Shake Correction Amount.

The integrator 203 in FIG. 2 integrates the angular velocity on which signal processing is performed by the filter circuit in S713. An angle value obtained by integration is output to the control determination unit 204 as a target control value (hand shake correction amount) of hand shake correction control. Then, the process transitions to a return process.

Next, calculation of a shutter speed for panning shown in S608 in FIG. 7 will be described with reference to a flowchart in FIG. 9.

(S801) Acquiring Background Flow Amount.

The camera control unit 143 acquires a setting value ($\alpha$) of a background flow effect that is set by the photographer using the operation unit 142, and the process proceeds to the following S802.

(S802) Acquiring focal length.

The camera control unit 143 acquires focal length information transmitted from the lens control unit 112 through the mounting contact units 115 and 144, and the process proceeds to the following S803.

(S803) Acquiring Angular Velocity in Camera Main Body.

The camera control unit 143 acquires an angular velocity ($\omega c$) detected by the angular velocity sensor 171 in the camera main body 131, and then the process proceeds to the following S804.

(S804) Acquiring Subject Angular Velocity.

Figure 8:
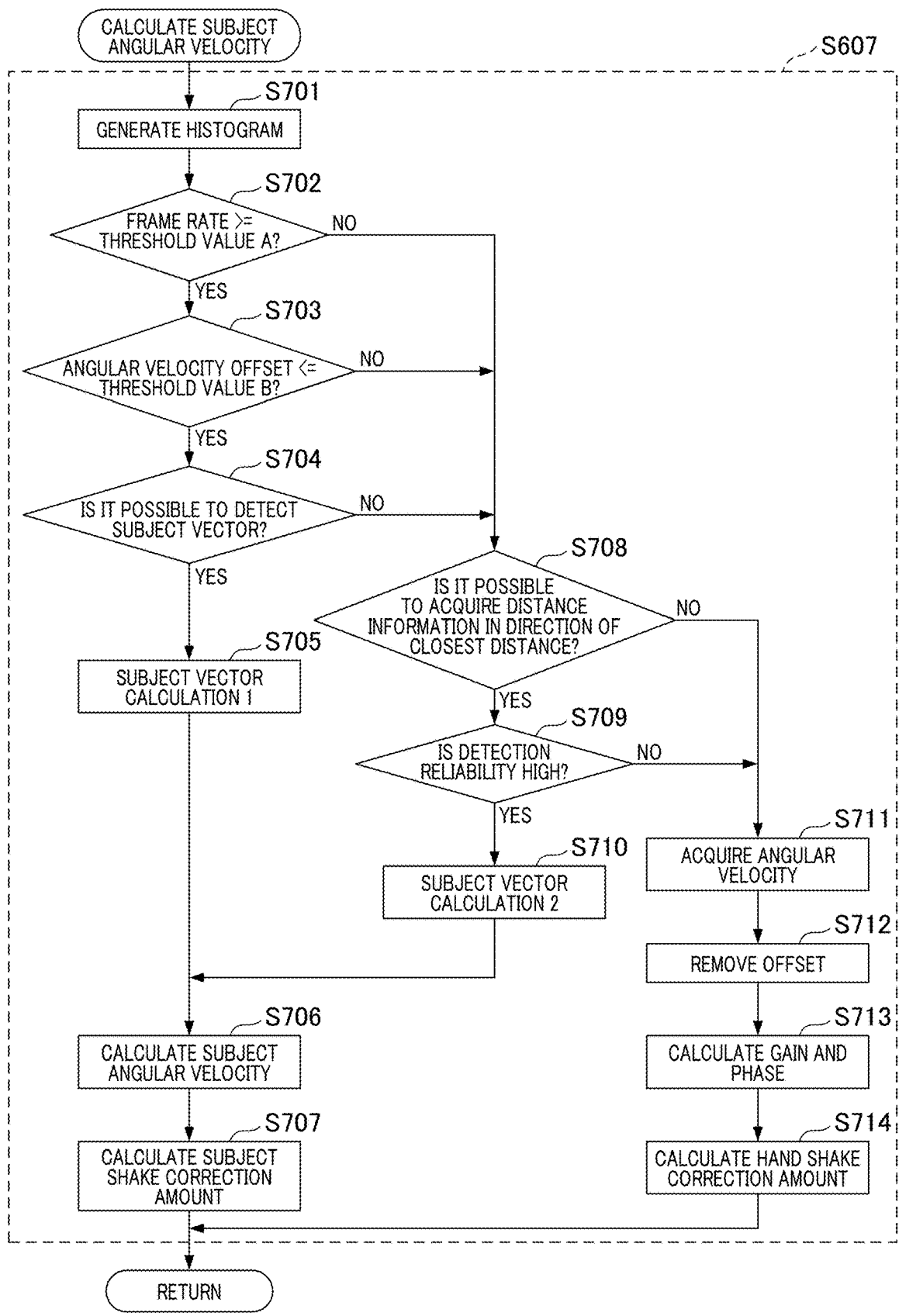
FIG. 8 is a flowchart of a first assist function in the present embodiment.
Figure 9:
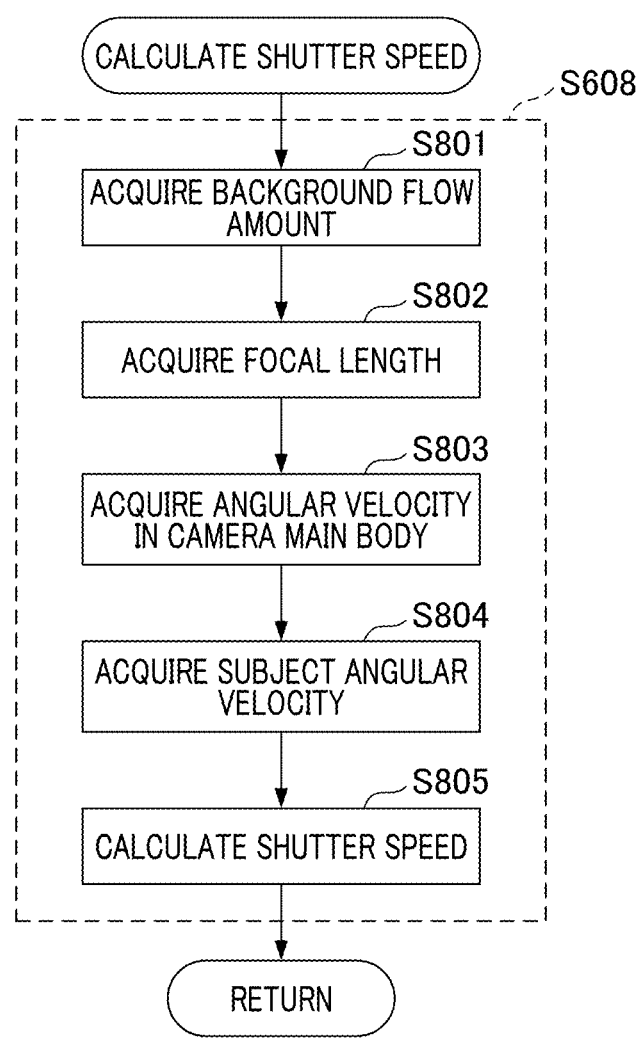
FIG. 9 is a flowchart of a second assist function in the present embodiment.

A subject angular velocity ($\omega s$) calculated in S706 in FIG. 8 is acquired, and process proceeds to the following S805.

(S805) Calculating Shutter Speed.

The shutter speed calculation unit 163 calculates a shutter speed (TV) for panning based on Formula (1) using data items acquired in S801 to S804. Here, when it is determined that a lens that does not support panning assist in S602 in FIG. 7 is attached to the camera main body 131, it is not possible to acquire the angular velocity detected by the angular velocity sensor 111. In this case, the angular velocity of the background is calculated from the background vector determined from the histogram in S701 in FIG. 8 and the shutter speed for panning is calculated. Alternatively, the shutter speed may be set according to a value (for example, 1/60 seconds) that is programmed in advance in the shutter speed calculation unit 163. Alternatively, a configuration may be provided in which the user can select automatic setting or manual setting using the operation unit 142 in order to set a shutter speed in the second assist function. That is, a photographer who is familiar with panning can manually and arbitrarily set a shutter speed. In addition, a photographer who is unfamiliar with panning can select an automatic setting.

In the present embodiment, it is possible to perform detection of the subject vector with high accuracy in order to calculate a drive signal of the shift lens. It is possible to easily take a pleasing panning picture in which a background image flows and image blur of a main subject is reduced according to the first and second assist functions related to panning assist.

While exemplary embodiments of the present invention have been described above using the imaging apparatus shown in FIG. 1 which is a so-called mirror-less camera, the present invention can be widely applied to a single lens reflex camera, a compact digital camera, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-039237, filed Mar. 2, 2017, which is hereby incorporated by reference wherein in its entirety.

What is claimed is:

1. An image blur correction apparatus comprising:
a memory; and
one or more processors, wherein the processor functions as the following units according to a program stored in the memory:
a detection unit configured to detect movement information between a plurality of images captured by an imaging apparatus, wherein the detection unit detects movement information of a plurality of image areas in each of the plurality of images;
a selection unit configured to select a target area from the plurality of image areas on the basis of distance information of the plurality of image areas, wherein the distance information is related to a distance between a subject and the imaging apparatus; and
a control unit configured to correct image blur of a subject present in the target area on the basis of movement information of the imaging apparatus and movement information of the target area selected by the selection unit.

2. The image blur correction apparatus according to claim 1, wherein the control unit calculates angular velocity data of the subject present in the target area with respect to the imaging apparatus on the basis of the movement information of the imaging apparatus and the movement information of the target area selected by the selection unit, and corrects image blur of the subject present in the target area on the basis of the calculated angular velocity data.

3. The image blur correction apparatus according to claim 1, wherein the selection unit selects an area from the plurality of image areas, which the area is in the direction of the closest distance, as the target area on the basis of the distance information of the plurality of image areas.

4. The image blur correction apparatus according to claim 1, wherein the processor functions as an acquisition unit configured to acquire the distance information of the plurality of image areas, and
wherein the acquisition unit acquires the distance information using a detection signal obtained by a phase difference detection unit for auto focus, a contrast evaluation value of an image signal obtained by an imaging unit, or an image signal obtained by an image plane phase difference type imaging element.

5. The image blur correction apparatus according to claim 4, wherein a range in which the movement information of the plurality of image areas is detected by the detection unit is equal to or smaller than a range in which the distance information is acquired by the acquisition unit.

6. The image blur correction apparatus according to claim 1, wherein the processor functions as a setting unit configured to set the distance information according to an operation by a user.

7. The image blur correction apparatus according to claim 2, wherein the control unit calculates the angular velocity data of the subject present in the target area using a focal length of an imaging optical system, a frame rate, and a pixel pitch of an imaging element.

8. The image blur correction apparatus according to claim 7, wherein, when the frame rate is smaller than a threshold value and a movement amount of the subject present in the target area in the direction of the closest distance is able to be acquired, the control unit integrates movement amounts of surrounding areas positioned in the direction of the closest distance using a position closest to a focus detection frame in a screen as a starting point and thus calculates a movement amount of the subject present in the target area.

9. The image blur correction apparatus according to claim 1,
wherein the processor functions as a mode setting unit configured to set a mode in which panning is supported, and
wherein, when the mode is set, the control unit corrects image blur of the subject present in the target area on the basis of the movement information of the imaging apparatus and the movement information of the target area selected by the selection unit.

10. The image blur correction apparatus according to claim 1, wherein the control unit corrects image blur of the subject present in the target area by controlling a position of a correction lens.

11. An imaging apparatus comprising:
an imaging unit; and
an image blur correction apparatus,
wherein the image blur correction apparatus comprises:
a memory; and
one or more processors, wherein the processor functions as the following units according to a program stored in the memory:
a detection unit configured to detect movement information between a plurality of images captured by the imaging apparatus, wherein the detection unit detects movement information of a plurality of image areas in each of the plurality of images;
a selection unit configured to select a target area from the plurality of image areas on the basis of distance information of the plurality of image areas, wherein the distance information is related to a distance between a subject and the imaging apparatus; and
a control unit configured to correct image blur of a subject present in the target area on the basis of movement information of the imaging apparatus and movement information of the target area selected by the selection unit.

12. The imaging apparatus according to claim 11, further comprising:
- a shake detection unit configured to detect shake of the imaging apparatus;
- a mode setting unit configured to set a mode in which panning is supported; and
- a control unit configured to, when the mode is set, calculate a shutter speed for panning from a detection signal obtained by the shake detection unit and an angular velocity of the subject present in the target area and perform shutter control.

13. A lens apparatus that is able to be attached to a main body of the imaging apparatus according to claim 11, the lens apparatus comprising:
- a memory; and
- one or more processors, wherein the processor functions as the following units according to a program stored in the memory:
  - an image blur correction unit configured to correct image blur of a subject captured by the imaging unit of the imaging apparatus;
  - a shake detection unit configured to detect shake of the lens apparatus; and
  - a control unit configured to calculate a control amount from a difference between a detection signal obtained by the shake detection unit and angular velocity data of a subject with respect to the imaging apparatus acquired from the main body of the imaging apparatus and control the image blur correction unit.

14. A control method executed in an image blur correction apparatus, the method comprising:
- detecting movement information between a plurality of images captured by an imaging apparatus, wherein, in the detecting, movement information of a plurality of image areas in each of the plurality of images is detected;
- selecting a target area from the plurality of image areas on the basis of distance information of the plurality of image areas, wherein the distance information is related to a distance between a subject and the imaging apparatus; and
- correcting image blur of a subject present in the target area on the basis of movement information of the imaging apparatus and movement information of the target area selected in the selecting.

* * * * *